(12) United States Patent
Kern (10) Patent No.: US 12,222,057 B2
(45) Date of Patent: Feb. 11, 2025

(54) FLUID CONNECTION ASSEMBLY

(71) Applicant: Oetiker NY, Inc., Lancaster, NY (US)

(72) Inventor: Robert J. Kern, Williamsville, NY (US)

(73) Assignee: Oetiker NY, Inc., Lancaster, NY (US)

( * ) Notice: Subject to any disclaimer, the term of this patent is extended or adjusted under 35 U.S.C. 154(b) by 0 days.

(21) Appl. No.: 18/250,257

(22) PCT Filed: Nov. 20, 2020

(86) PCT No.: PCT/US2020/061494
§ 371 (c)(1),
(2) Date: Apr. 24, 2023

(87) PCT Pub. No.: WO2022/108592
PCT Pub. Date: May 27, 2022

(65) Prior Publication Data
US 2023/0392732 A1    Dec. 7, 2023

(51) Int. Cl.
*F16L 37/091* (2006.01)
*F16L 37/084* (2006.01)

(52) U.S. Cl.
CPC ......... *F16L 37/091* (2013.01); *F16L 37/0847* (2013.01)

(58) Field of Classification Search
CPC .................................................. F16L 37/0847
See application file for complete search history.

(56) References Cited

U.S. PATENT DOCUMENTS

| 4,103,941 A | * | 8/1978 | Stoll | F16L 37/02 285/322 |
| 4,248,459 A | | 2/1981 | Pate et al. | |
| 4,275,907 A | | 6/1981 | Hunt | |
| 4,288,112 A | * | 9/1981 | Stoll | F16L 37/133 285/423 |
| 4,328,979 A | * | 5/1982 | Stoll | F16L 37/133 285/322 |
| 4,552,387 A | * | 11/1985 | Schmidt | F16L 33/225 285/190 |

(Continued)

FOREIGN PATENT DOCUMENTS

GB    2054081    2/1981

*Primary Examiner* — Zachary T Dragicevich
*Assistant Examiner* — James A Linford
(74) *Attorney, Agent, or Firm* — Harter Secrest & Emery LLP; Michael Nicholas Vranjes (57) ABSTRACT

A connector for fluid, including a connector body, including a first end, a second end, and a first through-bore, a retainer removably connected to the connector body, the retainer including a ring portion forming a third end, the third end operatively arranged to be secured in the first through-bore, at least one first finger extending from the ring portion, the at least one first finger including a first radially outward extending protrusion and terminating at a fourth end, and at least one second finger extending from the ring portion, the at least one second finger including a second radially outward extending protrusion, and at least one radially inward extending protrusion arranged on at least one of the at least one first finger and the at least one second finger, and a locking band arranged circumferentially around the at least one first finger and the at least one second finger.

10 Claims, 6 Drawing Sheets

(56) References Cited

U.S. PATENT DOCUMENTS

| | | | |
|---|---|---|---|
| 4,653,781 A | | 3/1987 | Sheets et al. |
| 4,846,506 A | | 7/1989 | Bocson et al. |
| 5,029,904 A | * | 7/1991 | Hunt .................... F16L 37/133 |
| | | | 285/924 |
| 5,242,431 A | * | 9/1993 | Kristiansen ........... A61M 25/02 |
| | | | 285/308 |
| 5,437,650 A | * | 8/1995 | Larkin ............... A61M 39/1011 |
| | | | 604/905 |
| 5,462,313 A | | 10/1995 | Rea et al. |
| 5,772,263 A | | 6/1998 | Lewis |
| 6,155,607 A | | 12/2000 | Hewitt et al. |
| 6,543,814 B2 | | 4/2003 | Bartholomew |
| 9,194,521 B2 | | 11/2015 | Cichorek et al. |
| 10,415,733 B2 | | 9/2019 | Hamon et al. |
| 2015/0060578 A1 | | 3/2015 | Prociw et al. |
| 2015/0211668 A1 | | 7/2015 | Campbell et al. |
| 2016/0258563 A1 | * | 9/2016 | Danielson ........... F16L 37/0847 |

\* cited by examiner

FLUID CONNECTION ASSEMBLY

CROSS-REFERENCE TO RELATED APPLICATIONS

The present application is the U.S. National Stage Application pursuant to 35 U.S.C. § 371 of International Patent Application No. PCT/US2020/061494, filed on Nov. 20, 2020, which application is hereby incorporated by reference in its entirety.

FIELD

The present disclosure relates to fluid connectors, and, more particularly, to a fluid connection assembly including a retainer that decreases the insertion force required for assembly and a locking band to ensure a secure connection.

BACKGROUND

Fluid connectors, fluid connections and fluid connection assemblies are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Another example of fluid traveling between components is refrigeration lines, which may carry a refrigerant. A refrigerant is a substance or mixture, usually a fluid, used in a heat pump and refrigeration cycle, and can be hazardous. As such, it is essential that fluid connectors for refrigeration lines be properly secured so as not to allow the release of any refrigerant.

Fluid predominantly moves between components via flexible or rigid hoses which connect to each component by fluid connectors. Such fluid connectors typically include a retaining clip, retaining ring clip, or snap ring carried on the connector body which is adapted to snap behind a raised shoulder of a tube when the tube is fully inserted into the connector body. However, in order for the fluid connector to properly function, slots or apertures must be machined in the connector body such that the retaining clip can protrude therethough and engage the tube, which requires extra post-process manufacturing. Additionally, during the assembly process, installation of the retaining clip onto the connector body is difficult and failure to install the retaining clip properly can jeopardize the structural integrity of the retaining clip. Also, the force required to engage the tube into the connector body, and overcome the radial force of the retaining clip, is very large with current designs. Furthermore, since the retaining clips are very thin and small, it is easy to lose them if dropped or misplaced.

Thus, there has been a long-felt need for a fluid connection assembly including a retainer that allows for disassembly, eliminates the need for post-process machining, and reduces the insertion force required to assemble the fluid connector.

SUMMARY

According to aspects illustrated herein, there is provided a fluid connection assembly, comprising a connector body, including a first end, a second end, and a first through-bore, a retainer operatively arranged to be removably connected to the connector body, the retainer including a ring portion forming a third end, the third end operatively arranged to be secured in the first through-bore, at least one first finger extending from the ring portion, the at least one first finger including a first radially outward extending protrusion and terminating at a fourth end, and at least one second finger extending from the ring portion, the at least one second finger including a second radially outward extending protrusion, and at least one radially inward extending protrusion arranged on at least one of the at least one first finger and the at least one second finger, and a locking band arranged circumferentially around the at least one first finger and the at least one second finger.

In some embodiments, when the retainer is connected to the connector body the at least one first finger and the at least one second finger extend out of the connector body from the second end. In some embodiments, the first radially outward extending protrusion is arranged between and spaced apart from the ring portion and the fourth end. In some embodiments, the second radially outward extending protrusion is arranged at the fourth end. In some embodiments, the at least one radially inward extending protrusion comprises a radially inward facing surface, the radially inward facing surface being frusto-conical. In some embodiments, the at least one radially inward extending protrusion extends from the fourth end to a position between and spaced apart from the fourth end and the ring portion. In some embodiments, the locking band is operatively arranged to engage the first radially outward extending protrusion and the second radially outward extending protrusion. In some embodiments, in an unlocked state, the locking band is arranged proximate the locking ring, and in a locked state, the locking band is arranged proximate the fourth end and engaged with the first radially outward extending protrusion and the second radially outward extending protrusion. In some embodiments, the at least one first finger and the at least one second finger are circumferentially spaced along the ring portion. In some embodiments, the retainer comprises a polymer.

According to aspects illustrated herein, there is provided a fluid connection assembly, comprising a connector body, including a first end, a second end, and a first through-bore, a retainer operatively arranged to be removably connected to the connector body, the retainer including a ring portion forming a third end, the ring portion operatively arranged to be secured in the first through-bore, a plurality of fingers extending from the ring portion and terminating at a fourth end, and at least one radially inward extending protrusion arranged on at least one of the plurality of fingers, and a locking band displaceably arranged around the plurality of fingers.

In some embodiments, when the retainer is connected to the connector body the plurality of fingers extend out of the connector body from the second end. In some embodiments, the plurality of fingers comprise at least one first finger including a first radially outward extending protrusion and at least one second finger including a second radially outward extending protrusion. In some embodiments, the first radially outward extending protrusion is arranged between and spaced apart from the ring portion and the fourth end. In some embodiments, the second radially outward extending protrusion is arranged at the fourth end. In some embodiments, the at least one radially inward extending protrusion comprises a radially inward facing surface, the radially inward facing surface being frusto-conical. In some embodiments, the at least one radially inward extending protrusion extends from the fourth end to a position between and spaced apart from the fourth end and the ring portion. In some embodiments, the locking band is operatively arranged to engage the first radially outward extending protrusion and the second radially outward extending protrusion, and the first radially outward extending protrusion and the second radially outward extending protrusion are operatively arranged to prevent axial displacement of the locking band. In some embodiments, in an unlocked state, the locking band is arranged proximate the locking ring, and in a locked state, the locking band is arranged proximate the fourth end and engaged with the first radially outward extending protrusion and the second radially outward extending protrusion.

According to aspects illustrated herein, there is provided a fluid connection assembly, comprising a connector body, including a first end, a second end, and a first through-bore, a retainer operatively arranged to be removably connected to the connector body, the retainer including a ring portion forming a third end, the ring portion operatively arranged to be secured in the first through-bore, a plurality of fingers extending from the ring portion and terminating at a fourth end, the plurality of fingers circumferentially spaced along the ring portion, and at least one radially inward extending protrusion arranged on at least one of the plurality of fingers, and a locking band displaceably arranged around the plurality of fingers, wherein in an unlocked state, the locking band is arranged proximate the locking ring, and in a locked state, the locking band is arranged proximate the fourth end and prevents radially outward displacement of the plurality of fingers.

According to aspects illustrated herein, there is provided a quick connector assembly or quick connection mechanism, that may be used for refrigeration lines, that is easier to connect than known quick connectors. The fluid connection assembly of the present disclosure creates a serviceable hand connection for, for example, refrigeration and other fluid lines. In some embodiments, the fluid connection assembly comprises plastic and/or metal.

According to aspects illustrated herein, there is provided a fluid connection assembly comprising a connector body, a retainer, a locking band, and a tube. In some embodiments, the connector body comprises a metal. In some embodiments, the retainer comprises a plastic. In some embodiments, the locking band comprises a metal. The retainer is operatively arranged to be connected to the connector body, for example, by crimping a flange of the connector body around a first section of the retainer. The retainer comprises a plurality of fingers extending from the first section and out of the connector body. The locking band is arranged circumferentially around the plurality of fingers.

The tube comprises a shoulder (i.e., tapered flange) proximate a connecting end. The shoulder of the tube is arranged to be pressed into the retainer (i.e., the fingers). The shoulder will spread the fingers which include radially inward extending barbs or protrusions that snap over the shoulder surface when the tube is fully engaged with the retainer. Once the tube is fully engaged with the retainer, the locking band is displaced away from the connector body (i.e., from a proximate end of the fingers toward a distal end of the fingers) into a groove or barbed recess in the radially outward facing surface of the fingers thereby holding it in place and completing (i.e., locking) the connection.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

It should be appreciated that the term "tube" as used herein is synonymous with hose, pipe, channel, conduit, tube end form, or any other suitable pipe flow used in hydraulics and fluid mechanics. It should further be appreciated that the term "tube" can mean a rigid or flexible conduit of any material suitable for containing and allowing the flow of a gas or a liquid.

Figure 1A:
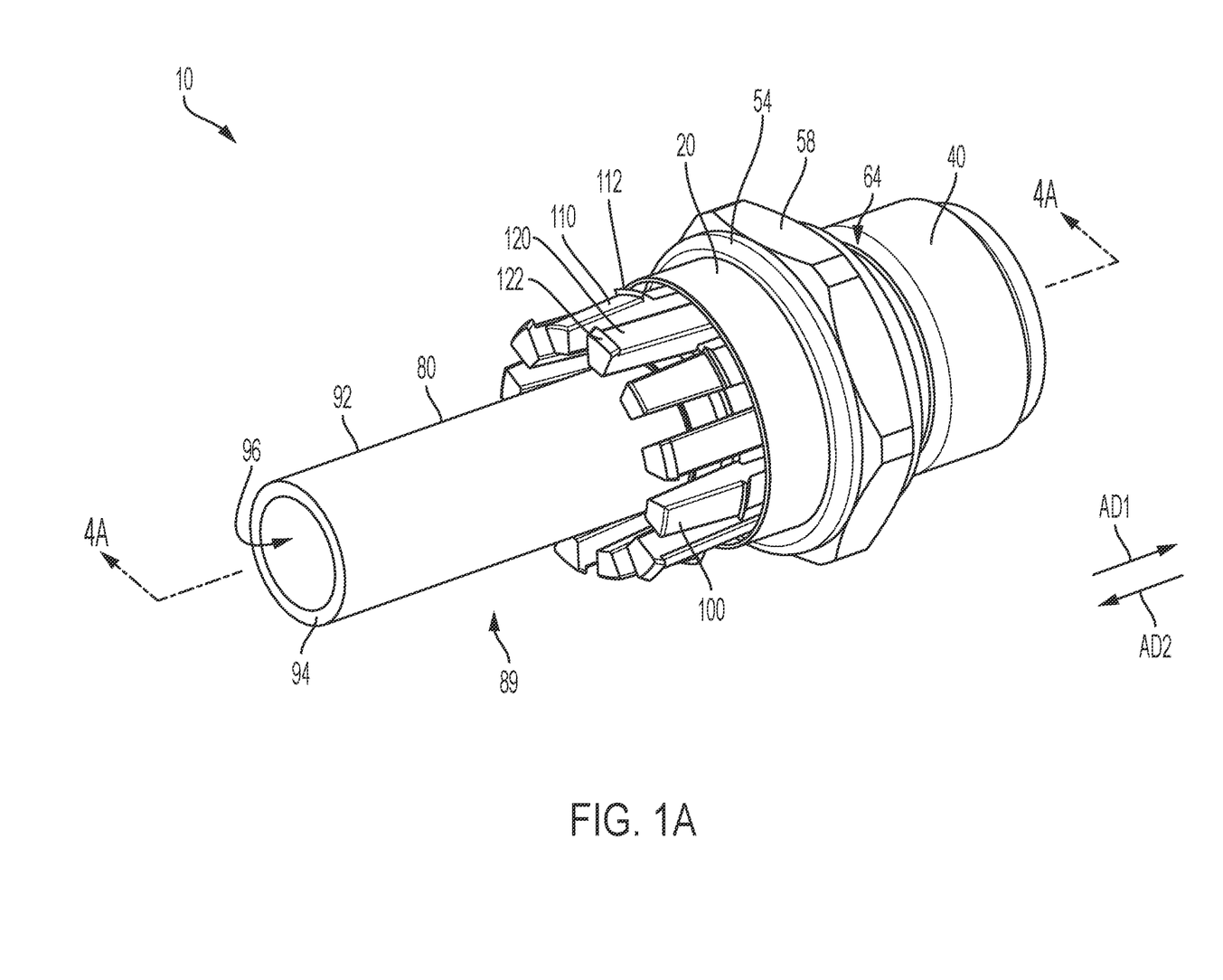
FIG. 1A is a perspective view of a fluid connection assembly, in an unlocked state.
Figure 1B:
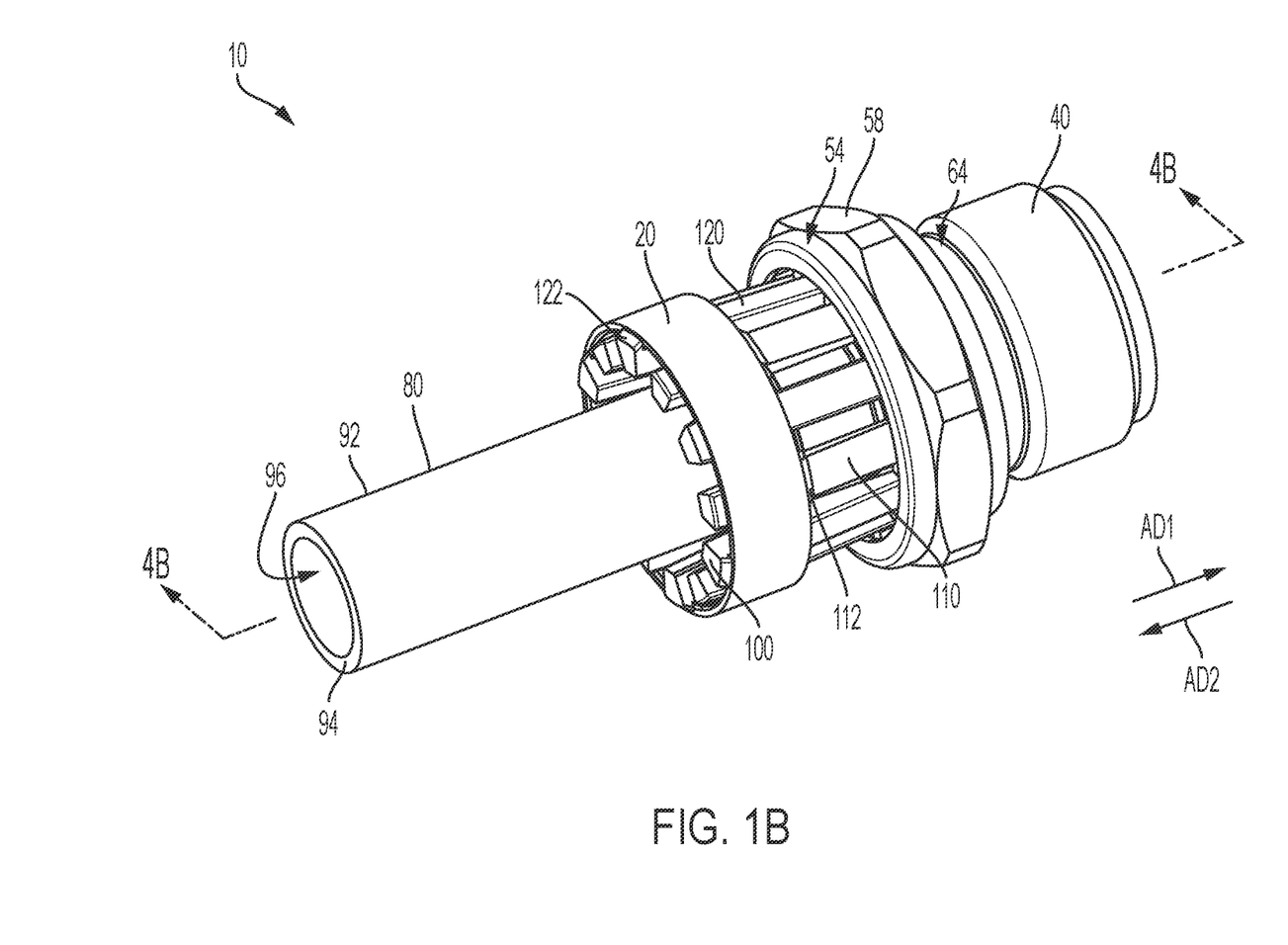
FIG. 1B is a perspective view of the fluid connection assembly shown in FIG. 1A, in a locked state.
Figure 2:
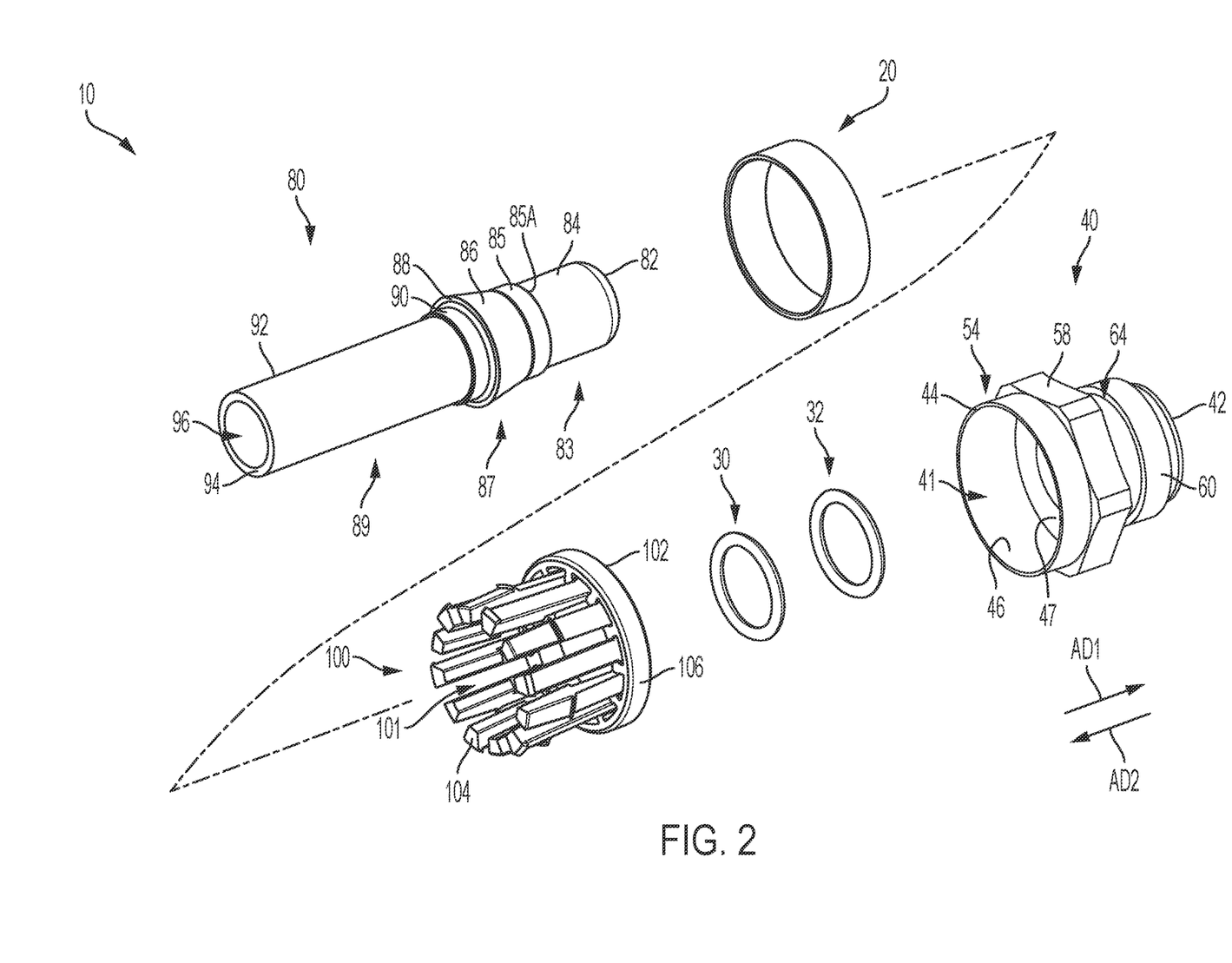
FIG. 2 is an exploded perspective view of the fluid connection assembly shown in FIG. 1A.

Adverting now to the figures, FIG. 1A is a perspective view of fluid connection assembly 10, in an unlocked state. FIG. 1B is a perspective view of fluid connection assembly 10 shown in FIG. 1A, in a locked state. FIG. 2 is an exploded perspective view of fluid connection assembly 10. Fluid connection assembly 10 generally comprises connector body 40, tube or tube or hose 80, and retainer 100. The following description should be read in view of FIGS. 1A-2.

Tube 80 comprises end 82, section 83, shoulder 87, section 89, end 94, and through-bore 96. Through-bore 96 extends through tube 80 from end 82 to end 94. Section 83 is arranged between end 82 and shoulder 87 and comprises radially outward facing surface 84. Radially outward facing surface 84 includes a substantially constant diameter. In some embodiments, radially outward facing surface 84 comprises a frusto-conical taper proximate end 82 (see FIGS. 4A-B). In some embodiments, section 83 further comprises a raised section, namely, radially outward facing surface 85, arranged between radially outward facing surface 84 and shoulder 87. Radially outward facing surface 85 has a diameter that is greater than the diameter of radially outward facing surface 84. Radially outward facing surface 85 is connected to radially outward facing surface 84 via surface 85A. In some embodiments, surface 85A is an axial surface facing axial direction AD1. Shoulder 87 is arranged between section 83 and section 89 and comprises radially outward facing surface 86 and surface 88. As shown, radially outward facing surface 86 is a frusto-conical surface extending from radially outward surface 84 to surface 88. Radially outward facing surface 86 increases in diameter is axial direction AD2. In some embodiments, radially outward facing surface 86 is an axial surface facing at least partially in axial direction AD1. In some embodiments, tube 80 comprises a constant diameter radially outward facing surface arranged between radially outward facing surface 86 and surface 88. Shoulder surface 88 is an axial surface facing at least partially in axial direction AD2. Section 89 is arranged between shoulder 87 and end 94 and comprises radially outward facing surface 92. Radially outward facing surface 92 includes a substantially constant diameter. In some embodiments, section 89 further comprises a raised section, namely, radially outward facing surface 90, arranged between shoulder surface 88 and radially outward facing surface 92. Radially outward facing surface 90 has a diameter that is greater than the diameter of radially outward facing surface 92. Tube 80 is arranged to be inserted, specifically with end 82 first, into connector body 40 and retainer 100. Tube 80 is inserted into connector body 40 and retainer 100 until fingers 110 and 120 snap over shoulder 87. It is the engagement of the projections of fingers 110 and 120 with shoulder surface 88 that secures tube 80 within connector body 40. It should be appreciated that tube 80 may be any traditional tube comprising a bead, radially outward extending protrusion or flange, or ramp profile, which extends radially outward and axially on the outer surface of the tube, to displace the fingers of a retainer and secure the tube within the connector body. In some embodiments, tube 80 comprises a metal. In some embodiments, tube 80 comprises a nonmetal (e.g., polymer, rubber, ceramic, etc.).

Figure 3A:
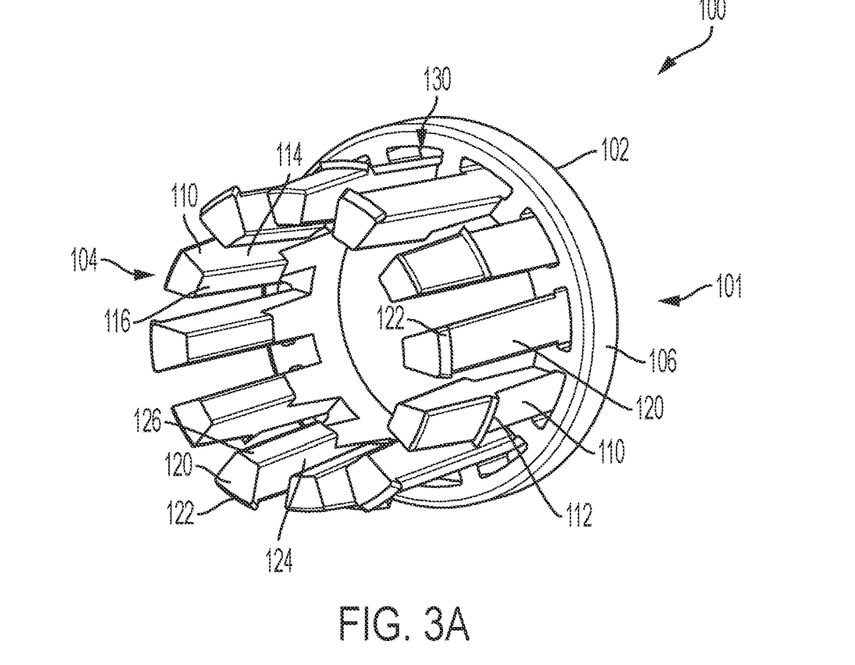
FIG. 3A is a perspective view of the retainer shown in FIG. 1A.
Figure 3B:
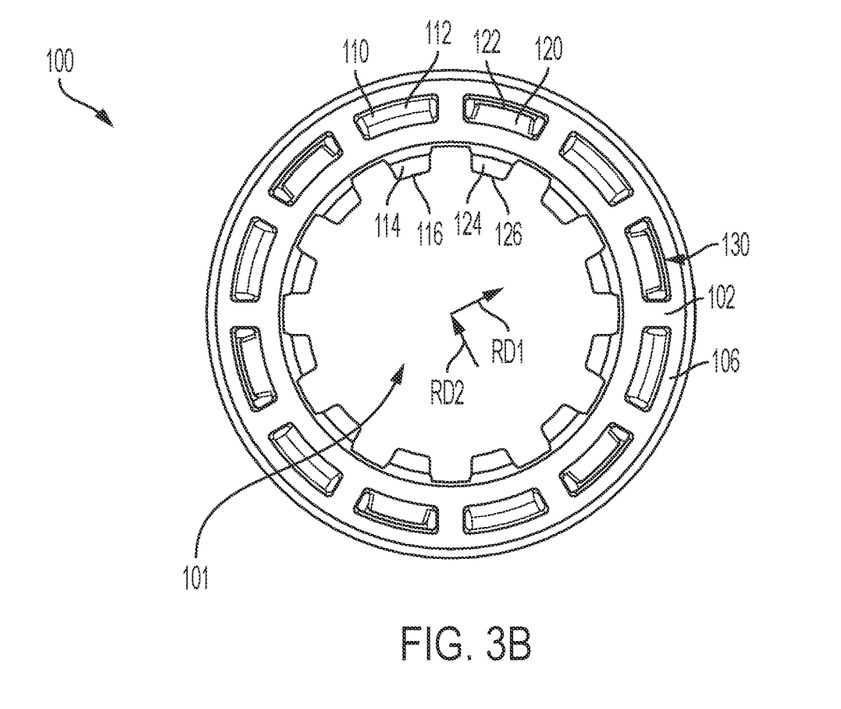
FIG. 3B is an elevational view of the retainer shown in FIG. 3A.

FIG. 3A is a perspective view of retainer 100. FIG. 3B is an elevational view of retainer 100. The following description should be read in view of FIGS. 1A-3B.

Retainer 100 generally comprises ring portion 106 forming end 102 and a plurality fingers (e.g., fingers 110 and fingers 120) extending from ring portion 106 and forming end 104. Ring portion 106 is generally ring shaped and comprises through-bore 101. In some embodiments, when retainer 100 is fully inserted into connector body 40, end 102 is operatively arranged to create the second half of the seal or O-ring gland (i.e., for groove 50).

Fingers 110 extend from ring portion 106 in axial direction AD2 and are operatively arranged to engage shoulder 87 of tube 80 and locking band 20. Each of fingers 110 comprises radially outward extending projection 112 and radially inward extending projection 114. Projections 112 extend in radial direction RD1 and are operatively arranged to engage locking band 20. Specifically, when in the locked state, projections 112 prevent locking band 20 from being displaced in axial direction AD1, as will be described in greater detail below. In some embodiments, projections 112 are arranged at a location between end 104 and locking ring 106. Projections 114 extend in radial direction RD2 and, when engaged with shoulder 87, lock tube 80 in retainer 100 (and connector body 40). Projections 114 form surfaces 116. In some embodiments, surfaces 116 are frusto-conical surfaces. As tube 80 is inserted into retainer 100 in axial direction AD1, frusto-conical surfaces 116 engage radially outward facing surface 86 of shoulder 87 forcing fingers 110 radially outward (i.e., in radial direction RD1). Once projections 114 are aligned with section 89 (i.e., once projections 114 axially pass shoulder 87), fingers 110 snap back radially inward (i.e., in radial direction RD2) and secure tube 80 within retainer 100. Fingers 110 are elastic and are operatively arranged to flex and/or bend relative to ring portion 106. In some embodiments, retainer 100 comprises a polymer. In some embodiments, fingers 110 comprise a recess or thinned out portion that allows greater flexion (i.e., arranged axially between projections 114 and ring portion 106). In some embodiments, fingers 110 are arranged such that the radially outward facing surface is frusto-conical (i.e., the radially outward facing surface increases in diameter in axial direction AD2).

Fingers 120 extend from ring portion 106 in axial direction AD2 and are operatively arranged to engage shoulder 87 of tube 80 and locking band 20. Each of fingers 120 comprises radially outward extending projection 122 and radially inward extending projection 124. Projections 122 extend in radial direction RD1 and are operatively arranged to engage locking band 20. Specifically, when in the locked state, projections 122 prevent locking band 20 from being displaced in axial direction AD2, as will be described in greater detail below. In some embodiments, projections 122 are arranged at end 104. Projections 124 extend in radial direction RD2 and, when engaged with shoulder 87, lock tube 80 in retainer 100 (and connector body 40). Projections 124 form surface 126. In some embodiments, surfaces 126 are frusto-conical surfaces. As tube 80 is inserted into retainer 100 in axial direction AD1, frusto-conical surfaces 126 engage radially outward facing surface 86 of shoulder 87 forcing fingers 120 radially outward (i.e., in radial direction RD1). Once projections 124 are aligned with section 89 (i.e., once projections 124 axially pass shoulder 87), fingers 120 snap back radially inward (i.e., in radial direction RD2) and secure tube 80 within retainer 100. Fingers 120 are elastic and are operatively arranged to flex and/or bend relative to ring portion 106. In some embodiments, fingers 120 comprise a recess or thinned out portion that allows greater flexion (i.e., arranged axially between projections 124 and ring portion 106). In some embodiments, retainer 100 further comprises apertures 130 arranged radially outward of fingers 110 and/or fingers 120. Apertures 130 extend at least partially through ring portion 106 and may aid in increasing the overall flexion of fingers 110 and 120. Apertures 130 also aid in the molding process of retainer 100. In some embodiments, fingers 120 are arranged such that the radially outward facing surface is frusto-conical (i.e., the radially outward facing surface increases in diameter in axial direction AD2).

In some embodiments, and as shown, fingers 110 and fingers 120 alternate circumferentially. In some embodiments, fingers 110 and fingers 120 do not alternate every single finger. For example, in a circumferential direction, two fingers 110 are adjacently arranged followed by two fingers 120 adjacently arranged. In another example, two fingers 110 are adjacently arranged, followed by one finger 120, followed by two fingers 110 adjacently arranged. It should be further appreciated that while projections 112 and 122 are arranged on adjacently formed fingers 110 and 120, respectively, in some embodiments, projections 112 and 122 are arranged on the same finger so as to limit movement of locking band 20 in the locked state of fluid connection assembly. In some embodiments, retainer 100 comprises a polymer.

Locking band 20 is generally arranged around retainer 100, specifically, fingers 110 and 120. Locking band 20 is operatively arranged to be displaced in axial directions AD2 and AD1 with respect to ring portion 106 to lock and unlock fluid connection assembly 10. Additionally, locking band 20 is arranged to engage projections 112 and 122 of fingers 110 and 120, respectively, as will be described in greater detail below. In some embodiments, locking band comprises a metal (e.g., steel, aluminum, etc.). In some embodiments, locking band 20 comprises a nonmetal (e.g., polymer, vinyl, etc.).

Figure 4A:
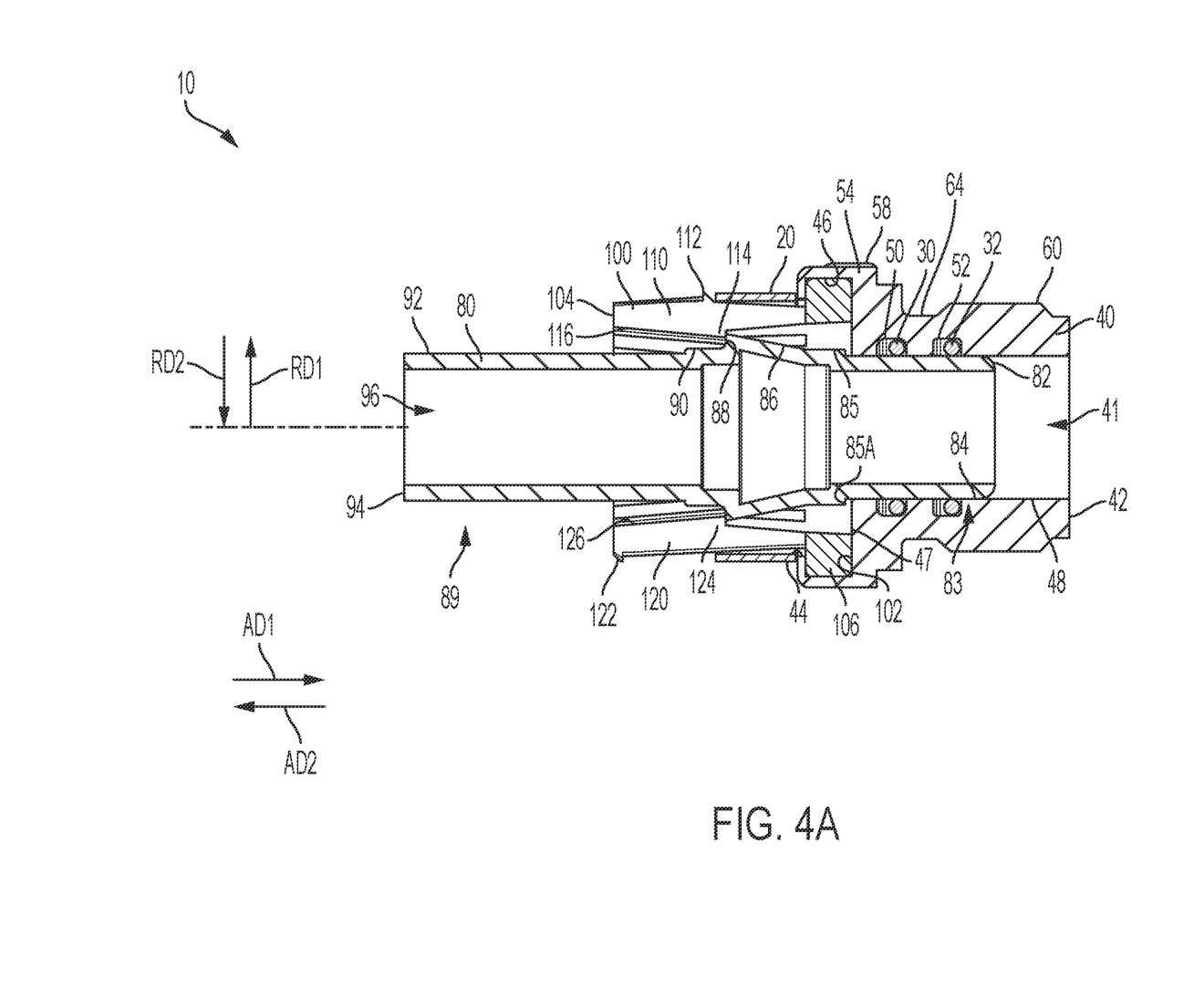
FIG. 4A is a cross-sectional view of the fluid connection assembly taken generally along line 4A-4A in FIG. 1A; and, FIG. 4B is a cross-sectional view of the fluid connection assembly taken generally along line 4B-4B in FIG. 1A.
Figure 4B:
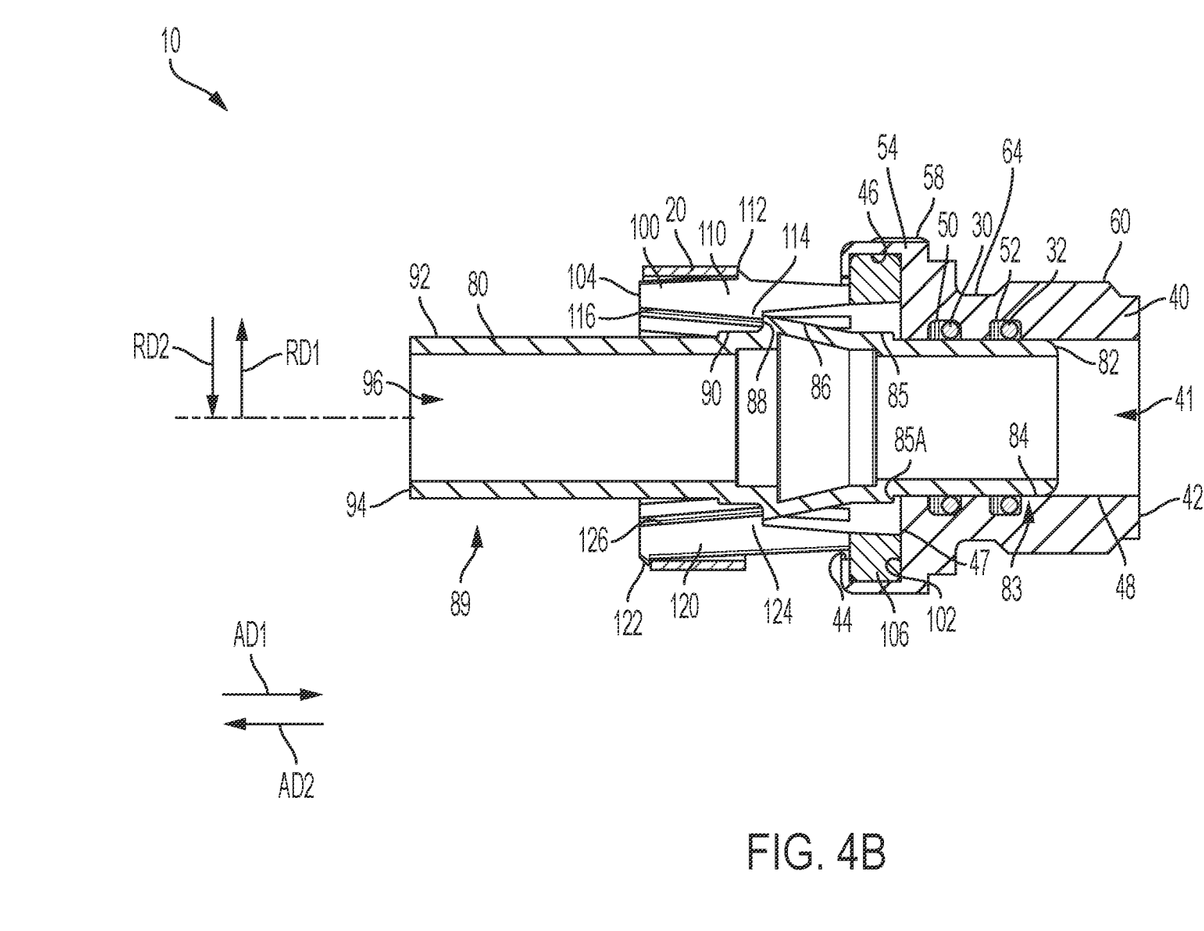

FIG. 4A is a cross-sectional view of fluid connection assembly 10 taken generally along line 4A-4A in FIG. 1A. FIG. 4B is a cross-sectional view of fluid connection assembly taken generally along line 4B-4B in FIG. 1A. The following description should be read in view of FIGS. 1A-4A.

Connector body 40 comprises through-bore 41 extending from end 42 to end 44, radially inward facing surface 46, radially inward facing surface 48, flange 54, head 58, and radially outward facing surface 60. Connector body 40 is arranged to be connected to a component that is filled with a fluid. For example, connector body 40 may be connected to a refrigeration compressor via radially outward facing surface 60, which may comprise external threading. Connector body 40 may be screwed into a threaded hole in the compressor via head 58 (e.g., using a wrench), which is then filled with refrigerant fluid. In some embodiments, head 58 is hexagonal; however, it should be appreciated that head 58 may comprise any geometry suitable for applying torque to connector body 40. Another component in which fluid connector 10, specifically connector body 40, may be installed into is a condenser, evaporator, or pump. It should be appreciated that fluid connector 10 may be used in various other components, assemblies, and subassemblies in which fluid connection is desired. Radially outward facing surface 60 may further comprise groove 64. A seal or O-ring may be arranged in groove 64 to create a fluid tight seal between connector body 40 and the component it is connected to. Seal 30 and/or seal 32 are arranged in connector body 40. Specifically, seal 30 is arranged in groove 50 and seal 32 is arranged in groove 32. Grooves 50 and 52 are arranged in radially outward facing surface 48. In some embodiments, seal 30 and seal 32 are O-rings. Connector body 40 further comprises surface 47, which extends between and connects radially inward facing surface 46 and radially inward facing surface 48. Surface 47 is operatively arranged to engage retainer 100, as will be described in greater detail below. Flange 54 extends from head 58 in axial direction AD2. Flange 54 is operatively arranged to be crimped around retainer 100 (i.e., in radially direction RD2), specifically ring portion 106, to secure retainer 100 to connector body 40. Flange 54 is shown crimped in Figures IA-B and 4A-B, and uncrimped in FIG. 2. In some embodiments, connector body 40 comprises a metal. In some embodiments, connector body 40 comprises a conductive material with flange 54 comprising a suitable malleable material.

To assembly fluid connection assembly 10, retainer 100 is inserted in axial direction AD1, with end 102 first, into connector body 40. As shown in FIGS. 4A-B, end 102 of retainer 100 engages surface 47 of connector body 40. Flange 54 is then crimped radially inward (i.e., in radial direction RD2), around ring portion 106, to secure retainer 100 within connector body 40. In the secured state, retainer 100 is prevented from displacement in axial direction AD1 by surface 47 and axial direction AD2 by crimped flange 54. It should be appreciated that tube 80 generally is not inserted into retainer 100 until flange 54 has been crimped. Then tube 80 is inserted in axial direction AD1, with end 82 first, into retainer 100. As tube 80 is inserted into retainer 100, frusto-conical surfaces 116 of projections 114 and frusto-conical surfaces 126 of projections 124 engage shoulder 87 displacing fingers 110 and fingers 120 radially outward, in radial direction RD1, respectively. Once projections 114 and projections 124 are aligned with section 89, fingers 110 and fingers 120 snap back radially inward, in radial direction RD2, and projections 114 and projections 124 engage shoulder 87 and shoulder surface 88, thereby securing tube 80 in retainer 100.

Once tube 80 is fully engaged in retainer 100, locking band 20 is displaced from the unlocked position (FIG. 4A) in axial direction AD2 to the locked position (FIG. 4B). Locking band 20 slides over projection 112 in axial direction AD2 due to the ramp surface arranged on projection 112. Once locking band 20 passes projection 112 in axial direction AD2, the axial surface of projection 112 prevents displacement of locking band 20 in axial direction AD1. Additionally, the axial surface of projection 122 prevents locking band 20 from displacing any further in axial direction AD2. Thus, in the locked state shown in FIGS. 1B and 4B, locking band engages projections 112 and 122 and is prevented thereby from displacing axially, which secures fluid connection assembly in the locked state.

It should be appreciated that, when retainer 100 is fully assembled to connector body 40, fingers 110 and fingers 120 extend out of, in axial direction AD2, connector body 40. Thus, when tube 80 is subsequently inserted into retainer 100, protrusions 114 of fingers 110 and protrusions 124 of fingers 120 engage shoulder 87 outside of connector body 40, rather than inside. This is advantageous because it allows for greater flexion of fingers 110 and fingers 120 and thus a lower required insertion force of tube 80 into retainer 100 (and connector body 40).

In some embodiments, and as shown in FIGS. 4A-B, in the fully assembled state surface 85A is arranged proximate to or abuts against surface 47. Thus, the engagement of surface 47 and surface 85A prevents displacement of tube 80 with respect to connector body 40 in axial direction AD1, and the engagement of projections 114 and 116 with shoulder 87 prevents displacement of tube 80 with respect to connector body 40 in axial direction AD2.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Fluid connection assembly
20 Locking band
30 Seal
32 Seal
40 Connector body
41 Through-bore
42 End
44 End
46 Radially inward facing surface
47 Surface
48 Radially inward facing surface
50 Groove
52 Groove
54 Flange
58 Head
60 Radially outward facing surface
64 Groove
80 Tube
82 End
83 Section
84 Radially outward facing surface
85 Radially outward facing surface
85A Surface
86 Radially outward facing surface
87 Shoulder
88 Surface
89 Section
90 Radially outward facing surface
92 Radially outward facing surface
94 End
96 Through-bore
100 Retainer
101 Through-bore
102 End
104 End
106 Ring portion
110 Finger
112 Projection
114 Projection
116 Surface
120 Finger
122 Projection
124 Projection
126 Surface
130 Aperture(s)
AD1 Axial direction
AD2 Axial direction
RD1 Radial direction
RD2 Radial direction

What is claimed is:
1. A fluid connection assembly, comprising:
a connector body, including:
  a first end;
  a second end; and
  a first through-bore;
a retainer operatively arranged to be removably connected to the connector body, the retainer including:
  a ring portion forming a third end, the ring portion operatively arranged to be secured in the first through-bore;
  a plurality of fingers extending from the ring portion and terminating at a fourth end, wherein the plurality of fingers comprise:
    at least one first finger including a first radially outward extending protrusion; and
    at least one second finger including a second radially outward extending protrusion; and
  at least one radially inward extending protrusion arranged on at least one of the plurality of fingers; and
a locking band displaceably arranged around the plurality of fingers;
wherein:
  the locking band is operatively arranged to engage the first radially outward extending protrusion and the second radially outward extending protrusion;
  the first radially outward extending protrusion is operatively arranged to prevent displacement of the locking band in a first axial direction;
  the second radially outward extending protrusion is operatively arranged to prevent displacement of the locking band in a second axial direction, opposite the first axial direction;
  in an unlocked state, the locking band is arranged proximate the ring portion; and in a locked state, the locking band is arranged proximate the fourth end and engaged with the first radially outward extending protrusion and the second radially outward extending protrusion.

2. The fluid connection assembly as recited in claim 1, wherein the at least one first finger and the at least one second finger are circumferentially spaced along the ring portion.

3. The fluid connection assembly as recited in claim 1, wherein the retainer comprises a polymer.

4. The fluid connection assembly as recited in claim 1, wherein when the retainer is connected to the connector body the plurality of fingers extend out of the connector body from the second end.

5. The fluid connection assembly as recited in claim 1, wherein the first radially outward extending protrusion is arranged between and spaced apart from the ring portion and the fourth end.

6. The fluid connection assembly as recited in claim 5, wherein the second radially outward extending protrusion is arranged at the fourth end.

7. The fluid connection assembly as recited in claim 1, wherein the at least one radially inward extending protrusion comprises a radially inward facing surface, the radially inward facing surface being frusto-conical.

8. The fluid connection assembly as recited in claim 1, wherein the at least one radially inward extending protrusion extends from the fourth end to a position between and spaced apart from the fourth end and the ring portion.

9. The fluid connection assembly as recited in claim 1, wherein the at least one radially inward extending protrusion comprises:
a surface arranged axially spaced apart from and parallel to the fourth end, the surface facing in a first axial direction; and
a frusto-conical radially inward facing surface extending in the first axial direction from the fourth end to the surface.

10. The fluid connection assembly as recited in claim 1, wherein:
a channel is formed axially between the first radially outward extending protrusion and the second radially outward extending protrusion; and
the locking band is arranged to engage the channel in a locked state.

* * * * *